United States Patent [19]

Vogt

[11] 4,287,931
[45] Sep. 8, 1981

[54] VACUUM-FORMING PROCEDURE IN METAL CASTING

[75] Inventor: Anton Vogt, Hanau, Fed. Rep. of Germany

[73] Assignee: M.A.N.-Roland Druckmaschinen Aktiengesellschaft, Fed. Rep. of Germany

[21] Appl. No.: 148,376

[22] Filed: May 9, 1980

[30] Foreign Application Priority Data

May 9, 1979 [DE] Fed. Rep. of Germany ....... 2918571

[51] Int. Cl.³ .................... B22C 9/02; B22C 23/08
[52] U.S. Cl. ................................. 164/7.2; 164/65; 264/25; 264/DIG. 78
[58] Field of Search ................. 164/7, 160, 65; 219/553; 264/131, 322, DIG. 78

[56] References Cited

U.S. PATENT DOCUMENTS

| 3,627,989 | 12/1971 | Heidler et al. | 219/553 |
| 3,789,907 | 2/1974 | Nakata et al. | 164/7 |
| 3,955,266 | 5/1976 | Honami et al. | 164/160 X |
| 4,028,455 | 6/1977 | Ueda et al. | 164/7 |

FOREIGN PATENT DOCUMENTS

| 138610 | 11/1979 | German Democratic Rep. | 164/7 |
| 50-51027 | 5/1975 | Japan | 164/7 |
| 50-29818 | 9/1975 | Japan | 164/7 |
| 54-107428 | 8/1979 | Japan | 164/7 |

Primary Examiner—Robert D. Baldwin
Attorney, Agent, or Firm—Leydig, Voit, Osann, Mayer & Holt, Ltd.

[57] ABSTRACT

The invention relates to metal casting employing a pattern in a sand mold. A thin film of translucent thermoplastic is coated with finely divided graphite and then superimposed on the pattern with the layer of graphite sandwiched in between. Infrared radiation is applied to the film to soften the same with the radiant heat which is absorbed by the graphite serving to speed up the softening process. Then while the film is in soft drawable condition the film is vacuum-formed onto the surface of the pattern with the graphite serving as a lubricant for the plastic film as the film is drawn about irregular or deeply indented surfaces on the pattern to produce a tightly conforming barrier layer. Sand is molded about the pattern and its barrier layer to form a mold, following which the pattern is withdrawn leaving the layer in conforming and supporting contact with the sand. In the preferred form of the method a slight vacuum is applied through the molding sand while molten metal is poured in to hold the film in place against the sand and for sucking away vapors resulting from the decomposition of the film.

4 Claims, 4 Drawing Figures

VACUUM-FORMING PROCEDURE IN METAL CASTING

It is known to apply a film of heated thermoplastic material to a pattern to form an outer layer thereon, with the layer being left in the mold as the pattern is withdrawn. This procedure works relatively well for smooth objects of simple shape but difficulties have been experienced in attempting to apply this technique to highly irregular or deeply indented objects. In order to make the film conform to deep indentations it is necessary to heat it to a higher temperature by radiation which runs the risk of melt-through because of the poor heat absorbing characteristics of the film. Moreover, when the highly heated film is brought into contact with the pattern, the film tends to stick to the pattern and to tear as attempts are made to conform the film to deeply indented recesses.

Accordingly, it is an object of the present invention to provide a method of casting which includes the steps of applying a thin layer of finely divided graphite to one side of the plastic film to form a heat absorbing and lubricating layer between the film and the pattern. More specifically, it is an object to provide a method of casting in which finely divided graphite is employed as a heat absorbing agent for the film when subjected to a source of infrared radiation, thereby to substantially reduce the heating time of the film and making the heating more uniform and thus avoiding localized tackiness or any tendency toward localized melt-through.

It is another specific object to provide a method of pattern preparation for a casting operation in which finely divided graphite serves to lubricate the film with respect to the surface of the pattern during the time that the film is being applied to the pattern so as to permit localized shifting of the film, with relief of stress, and also acts as a parting agent, permitting the pattern to be withdrawn from the mold to form a mold cavity while leaving the film in the form of a barrier layer in conforming and supporting contact with the sand.

It is one of the features of the present invention that it permits good results to be obtained even with patterns having a rough or unfinished surface. It follows from this that patterns may be used which are less highly finished and which can be produced at lower cost.

It is another object of the invention, in one of its aspects, to maintain the film in place against the sand and for removing the products of decomposition as the film is struck by the hot metal. This is done by applying a slight vacuum through the sand as the metal is poured into the mold.

It is a general object to provide a method of casting which is highly economical, which requires little investment in additional equipment or facilities and which produces castings of substantially higher quality than those normally obtained.

Other objects and advantages of the invention will become apparent upon reading the attached detailed description and upon reference to the drawings in which.

While the invention has been described in connection with a preferred form of the method, it will be understood that I do not intend to be limited to the particular procedure which has been described but intend, on the contrary, to cover the alternative and equivalent methods included within the spirit and scope of the appended claims.

Figure 1:
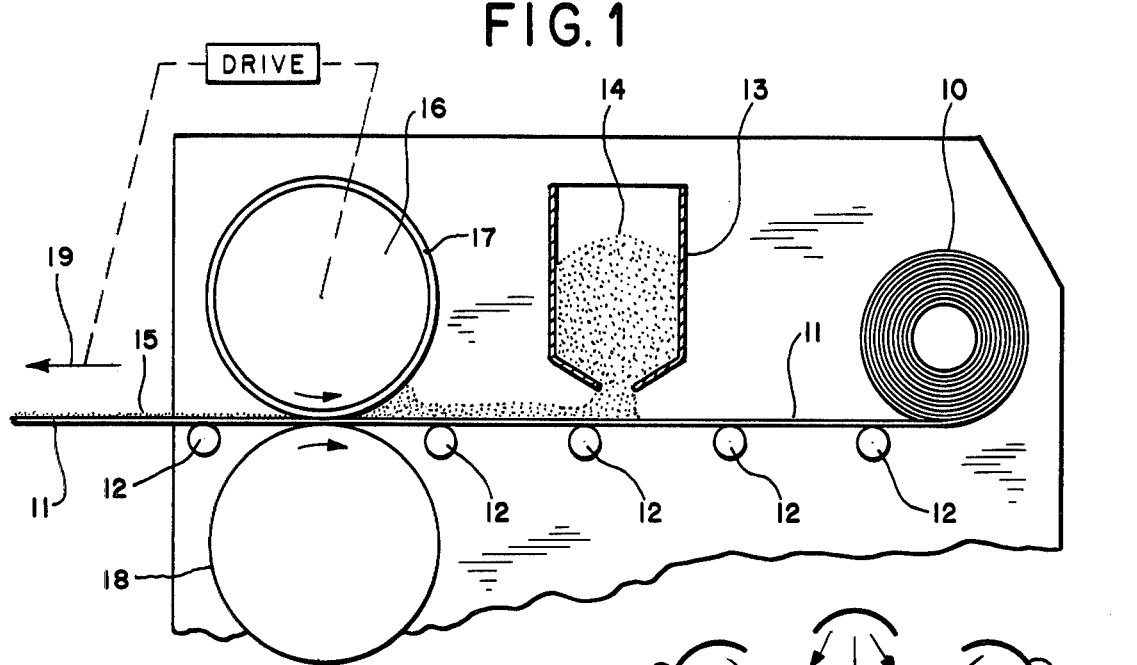
FIG. 1 is an elevational diagram showing the coating of thermoplastic film with a layer of finely divided graphite.

Referring now to FIG. 1 there is shown a graphite applicator used in carrying out the present invention. It includes a supply roll 10 of plastic film 11 supported on a series of laterally spaced rollers 12. Arranged downstream from the supply roll is a hopper 13 containing a charge of finely divided graphite 14 which is discharged as a relatively thick layer upon the film.

For the purpose of applying a thin even coating 15 of the graphite to the film, a driven applicator roller 16 is provided having a fabric layer 17, the roller 16 working against a back-up roller 18 on the underside of the film. Traction is provided by any desired means 19 located downstream of the applicator roller. The roller 18 is preferably driven in the clockwise direction, as indicated, at a speed which may be equal to, greater than or less than the speed of the roller 16. Or, if desired, without departing from the invention the roller 18 may be mounted for idle rotation. It is found that using an ordinary commercial form of powdered graphite, the applicator roller 16 may be vertically adjusted so as to produce a thin, even layer of graphite which is quite adherent to the film and which appears to be held thereon by electrostatic forces in addition to adhesion.

The film which I prefer to use is formed of ethylenevinylacetate which may be clear, cloudy, or pigmented but which is still sufficiently translucent as to be able to be penetrated by radiation of red and infrared wavelength. It will be apparent to one skilled in the art, however, that the invention is not limited to use of this particular material and that other thermoplastic films may be employed having equivalent physical, thermal and translucent properties without departing from the invention.

Figure 2:
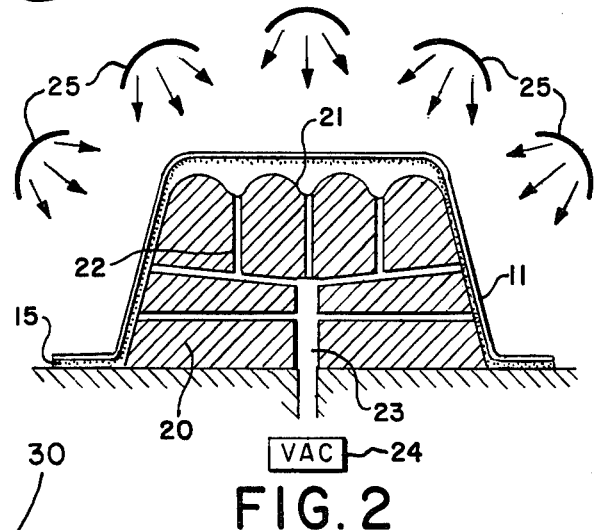
FIG. 2 shows the resulting film being heated and drawn onto the surface of the pattern with the graphite between the film and the pattern.

In utilizing the graphite coated film in carrying out the invention, the film is heated by infrared radiation to soften the same just prior to contact with the pattern as disclosed in FIG. 2 with the graphite sandwiched in between the film and the pattern and with the pattern being penetrated by passageways communicating with the surface of the pattern and to which a source of vacuum is applied.

Thus a pattern 20 is used having an outer surface 21 together with a series of vacuum passageways 22 connecting the surface to a vacuum connection 23 to which a source of vacuum 24 is applied. The pattern has, extending over its entire presented surface 21, a layer of the plastic film 11 coated with graphite 15, with the graphite being interposed, as shown, between the film and the pattern. The surface of the film which is to be in contact with the surface of the pattern is heated by a set of infrared heat lamps 25. It is found that the presence of the graphite on the underside of the film 11, by its absorption of the incident radiation, serves to heat the film much more quickly and much more evenly than where the graphite is not used, the heating time typically being reduced to about one-third of that normally required. Because of the even distribution of the graphite the plastic is evenly heated to the softening temperature without running risk of hot spots with resultant tackiness or "melt-through".

While FIG. 2 shows a film being heated in a position in which it surrounds the pattern, that is to say in situ, it will be understood that the invention is not limited thereto and includes the heating of the film in the flat state prior to application to the pattern, provided that the film is applied sufficiently promptly so that it is still in the well-softened state when the vacuum is applied. Or, if desired, the film may be heated by radiation both in its flat, pre-application state and also when the film is in its position about the pattern.

With the film covering the pattern, vacuum is applied from the source 24 so that air is evacuated from the surface 21 of the pattern through the evacuation ports 22 causing the heated and softened film to be drawn into close, conforming all-over contact with the pattern; that is to say, the film is drawn downwardly into the deepest indentations of the pattern while being stretched over the projecting portions thereof. It is found that the graphite performs a valuable lubricating function during this application since it permits localized shifting of the film along the surface of the pattern allowing the film to accommodate itself to the stresses which are set-up in the film by its distortion and preventing the build-up of stress at any particular point which might result in causing the film to tear or to be stretched so thin that a hole develops.

It is found that the presence of the finely divided graphite, as a lubricant, enables the above process, using usually referred to as vacuum-forming, to be performed much more quickly and with a higher degree of vacuum than is conventional. Stepping up the speed tends to insure that the vacuum-forming process is completed while the plastic is still in its heated and uniformly plastic and drawable state and before it has had opportunity to become chilled by reason of its contact with the mold surface. It is found that good results are achieved even where patterns are used having a rough rather than polished surface. The result is to apply to the pattern a tightly conforming barrier layer of plastic which follows all of the detailed contours of the pattern.

Figure 3:
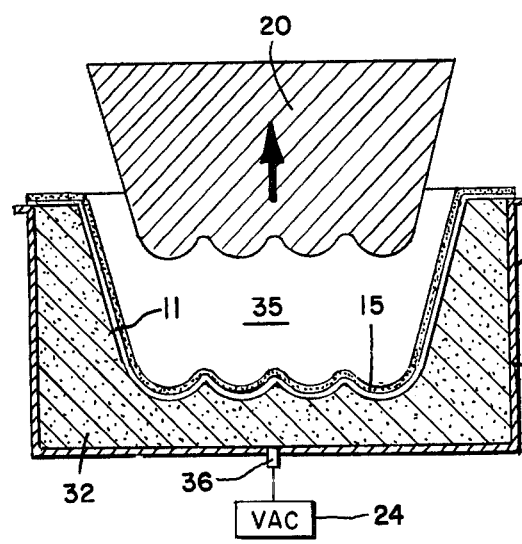
FIG. 3 shows withdrawal of the pattern from the flask.

The pattern with its conforming layer of plastic is then placed in a flask containing a charge of molding sand. Referring to FIG. 3 the flask indicated generally at 30 has a drag 31 containing a quantity of molding sand 32 which is packed and vibrated about the pattern by conventional means. The presence of the relatively slippery plastic surface facilitates the entry and packing of the sand into all the detailed surface features of the pattern.

Figure 4:
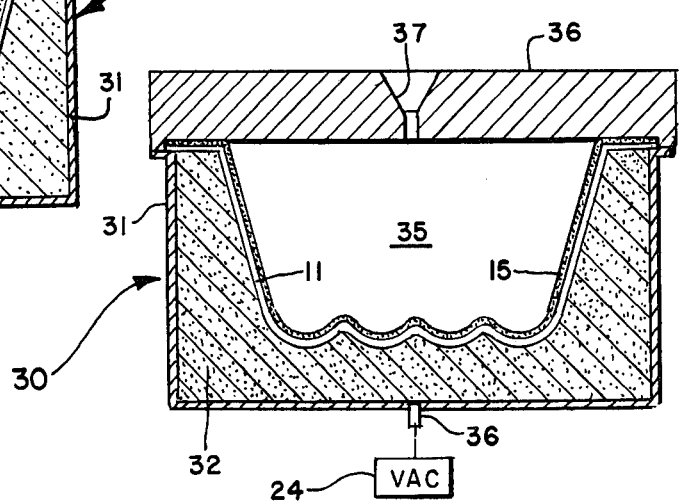
FIG. 4 is a cross section taken through the flask after the pattern has been removed and with a lined mold cavity formed in the sand in preparation for pouring of metal.

Following this the pattern is withdrawn upwardly, as shown, leaving the plastic film, in the form of a shell or barrier layer in conforming and supporting contact with the sand, in the face of the withdrawal forces, with the graphite acting as a parting agent during the withdrawal step. The result is to produce a cavity 35 which is lined with a plastic layer 11 having a dusting of graphite 15 thereon. The flask is completed by addition of a cover or cope 36 (FIG. 4) having a sprue 37.

In carrying out the invention in one of its aspects, a source of vacuum such as that indicated at 24 is applied to the molding sand 31 by a connection 36 made to the drag. The vacuum, as applied to the sand, performs several functions. In the first place the vacuum may be applied incident to withdrawing the pattern (FIG. 3) to hold the isolating layer of plastic in place and to insure that the sand remains undisturbed as the pattern is disengaged. Secondly, the application of vacuum to the flask insures that the sand is not dislodged during the period just before, and during, the pouring of the metal. Finally, the presence of vacuum serves to withdraw the fumes resulting from the decomposition of the plastic film as it is engaged by the molten metal to avoid the formation of surface voids in the cast product.

While the invention has been described in connection with a pattern having well defined vacuum passageways 22, it will be understood that discrete passages are not necessary and that, if desired, the entire pattern may be formed of porous material subjected to vacuum through connection 23.

While the term "graphite" has been used for convenience in describing the combined radiation-absorbing, lubricating and parting material, it will be understood that the invention is not limited thereto and that other finely divided lubricating substances may be used having the dark pigmentation and slipperiness which is characteristic of graphite without departing from the present invention.

What I claim is:

1. In the method of metal casting which includes placing a pattern in sand to form a mold for the metal, the steps which include pre-coating a thin film of translucent thermoplastic material with a thin layer of finely divided graphite, applying infrared radiation to the film to soften the same facilitated by the radiant heat absorbed by the graphite, then while the film is still in soft drawable condition vacuum-forming the film onto the surface of the pattern with the graphite sandwiched in between by applying vacuum through the body of the pattern so that the graphite serves as a lubricant for the plastic film as the film is drawn about irregular surfaces on the pattern to produce a tightly conforming barrier layer, molding sand about the pattern and its barrier layer to form a mold, and then removing the pattern from the mold while leaving the film in the form of the barrier layer in conforming and supporting contact with the sand.

2. The method as claimed in claim 1 which includes applying a slight vacuum through the molding sand simultaneously with the withdrawal of the pattern with the vacuum serving to hold the barrier layer in place against the sand in the face of withdrawal forces applied to the pattern.

3. The method as claimed in claim 1 which includes pouring molten metal into the mold to occupy the cavity formed by the pattern while simultaneously applying a slight vacuum through the molding sand with the vacuum serving to hold the barrier layer in place against the sand and for sucking away vapors resulting from the decomposition of the film as it is engaged by the molten metal.

4. The method as claimed in claim 1 in which the thermoplastic material is ethylenevinylacetate copolymer.

* * * * *